United States Patent [19]
Winter

[11] Patent Number: 5,582,661
[45] Date of Patent: Dec. 10, 1996

[54] TREAD FOR PNEUMATIC VEHICLE TIRES

[75] Inventor: Hans-Joachim Winter, Gelnhausen, Germany

[73] Assignee: SP Reifenwerke GmbH, Hanau, Germany

[21] Appl. No.: 282,013

[22] Filed: Jul. 29, 1994

[30] Foreign Application Priority Data

Aug. 3, 1993 [DE] Germany .......................... 43 26 036.5

[51] Int. Cl.$^6$ .................................................. B60C 11/12
[52] U.S. Cl. .................................. 152/209 R; 152/DIG. 3
[58] Field of Search .......................... 152/209 R, 209 D, 152/DIG. 3; D12/146, 147

[56] References Cited

U.S. PATENT DOCUMENTS

| | | | |
|---|---|---|---|
| D. 309,723 | 8/1990 | Nock et al. | D12/146 |
| D. 351,368 | 10/1994 | Graas et al. | D12/147 |
| D. 354,029 | 1/1995 | Voigt et al. | D12/147 |
| 3,674,077 | 7/1972 | Verdier | 152/209 R |
| 4,598,747 | 7/1986 | Flechtner | 152/209 R |
| 5,088,536 | 2/1992 | Graas et al. | 152/209 R |

FOREIGN PATENT DOCUMENTS

| | | | |
|---|---|---|---|
| 0455925 | 11/1991 | European Pat. Off. . | |
| 0477542 | 4/1992 | European Pat. Off. . | |
| 506279 | 9/1992 | European Pat. Off. | 152/209 R |
| 0544638 | 6/1993 | European Pat. Off. . | |
| 1519649 | 4/1968 | France . | |
| 3540668 | 5/1987 | Germany | 152/DIG. 3 |
| 8809991 | 10/1988 | Germany . | |
| 3924017 | 3/1990 | Germany | 152/209 R |
| 4300695 | 7/1994 | Germany . | |
| 114605 | 9/1980 | Japan . | |
| 106704 | 4/1989 | Japan | 152/DIG. 3 |
| 53611 | 2/1990 | Japan | 152/209 R |
| 254004 | 10/1990 | Japan | 152/209 R |
| 286405 | 11/1990 | Japan | 152/209 R |
| 232104 | 8/1992 | Japan | 152/209 R |

*Primary Examiner*—Steven D. Maki
*Attorney, Agent, or Firm*—Birch, Stewart, Kolasch & Birch, LLP

[57] ABSTRACT

A tread for pneumatic vehicle tires comprising a central row of tread blocks extending in the circumferential direction of the tire and rows of tread blocks arranged in the shoulder regions of the tire is described. The rows of blocks arranged in the shoulder regions of the tire are separated from the central row of tread blocks by circumferential grooves. The edges of the tread blocks which laterally border the circumferential grooves extend inclined relative to the central circumferential plane of the tire. Wave-shaped sipes or knife-cuts are provided in the tread blocks with the tread blocks of the rows of blocks arranged in the shoulder regions of the tire being more pronouncedly divided or split by sipes than the tread blocks of the central row blocks.

5 Claims, 1 Drawing Sheet

TREAD FOR PNEUMATIC VEHICLE TIRES

The present invention relates to a tread for pneumatic vehicle tires comprising a central row of tread blocks extending in the circumferential direction of the tire and row of tread blocks arranged in the shoulder regions of the tire which are separated from the central row of tread blocks by circumferential grooves.

BACKGROUND OF THE INVENTION

Tread patterns of this kind are typically used in summer tires. The lateral edges of the circumferential grooves are arranged parallel to the central circumferential plane. Since such tire treads or patterns have been developed especially for summer use, the winter performance of a tire equipped with such a profile is, in most cases, inadequate.

SUMMARY OF THE INVENTION

The object of the invention is to provide a tread for pneumatic vehicle tires of the initially named kind which has improved winter performance so that a tire constructed in accordance with the invention can be used as an all-year tire.

According to one aspect of the invention a tread for a pneumatic vehicle tire comprises a central row of tread blocks extending in the circumferential direction of the tire and rows of tread blocks arranged in the shoulder regions of the tire which are separated from the central row of tread blocks by circumferential grooves characterized in that the edges of the tread blocks which laterally border the circumferential grooves extend inclined relative to the central circumferential plane of the tire, and in that wave-shaped sipes are provided in the tread blocks, with the tread blocks of the rows of blocks arranged in the shoulder regions of the tire being more pronouncedly divided up by the sipes than the tread blocks of the central row of blocks.

A zig-zag shaped course of the circumferential grooves is achieved by the edges of the tread blocks extending inclined whereby an improvement in the digging-in of the tread into snow (grip) and a better self-cleaning (snow clearing) is achieved.

Through the use of wave-shaped sipes in all the tread blocks, the traction and braking action in snow is improved, in particular. Moreover, there are also beneficial effects on the lateral stability or lateral traction of the tire since the onset of slip occurs later. Due to the particularly good dividing-up of the tread blocks of the rows of blocks arranged in the shoulder regions of the tire, the tread blocks of the central rows of blocks can be less pronouncedly divided up, whereby a reduction in the running noise is achieved.

According to an advantageous embodiment of the invention, the lateral boundary edges of one circumferential groove extend substantially parallel to one another, and, in particularly, also parallel to the lateral boundary edges of the other circumferential groove. By so doing, a particularly accentuated zig-zag course of the circumferential groove is obtained, whereby a particularly good grip of the pattern in snow is achieved.

In accordance with a further embodiment, the sipes in the tread blocks of the rows of blocks arranged in the shoulder regions are arranged substantially perpendicular to the circumferential direction of the tire. By reason of the perpendicular arrangement of the sipes, the lateral stability of the tread blocks is retained which has beneficial effects for the dry weather performance and, in particular, on the steering properties.

In accordance with a further preferred embodiment of the invention, the number of tread blocks of the row of blocks arranged in one of the shoulder region is equal to the number of tread blocks of the central row of blocks and amounts to, depending on the diameter of the tire, preferably 70 or more tread blocks. By so doing, more cross-edges are created giving better traction in snow and increased braking action.

In accordance with a further preferred embodiment of the invention, the tread blocks of the rows of blocks arranged in the shoulder regions are arranged so as to be displaced in the circumferential direction of the tire relative to the tread blocks of the central row of blocks. A design of this kind leads, in particular, to a reduction of the running noise and to a better running stability on dry roads.

Further advantageous embodiments of the invention are given in the subordinate claims.

BRIEF DESCRIPTION OF THE DRAWING

The present invention will become more fully understood from the detailed description given hereinbelow and the accompanying drawing which is given by way of illustration only, and thus is not limitative of the present invention, and wherein:

The single FIGURE shows a schematic partial plane view of a tread design in accordance with the invention.

Figure 1:
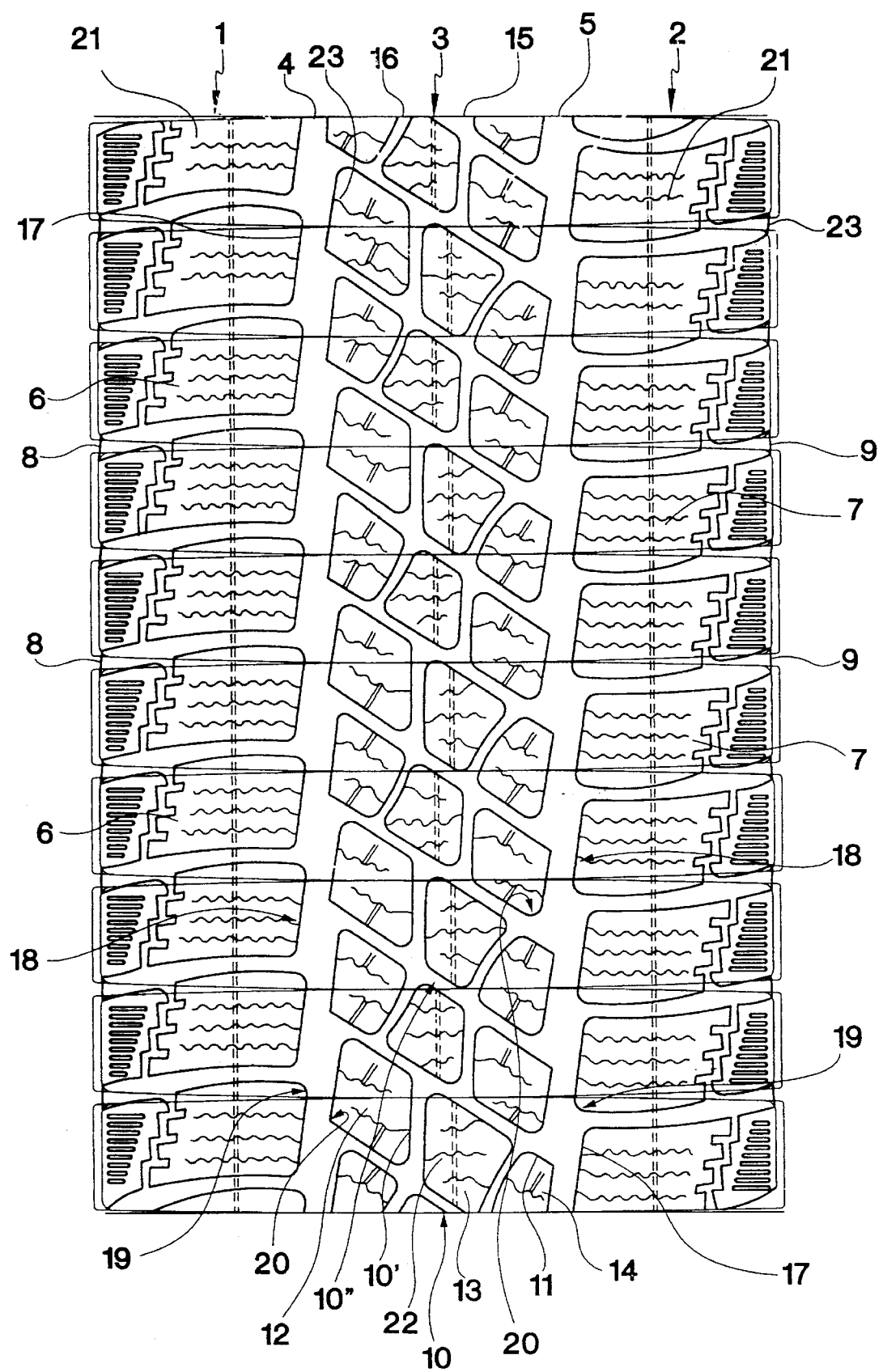

The invention is described in the following by means of example only and with reference to the single figure which shows a schematic partial plane view of a tread design in accordance with the embodiments of the invention.

DETAILED DESCRIPTION OF THE EMBODIMENTS

The tread pattern shown includes two rows of blocks 1,2 arranged in the shoulder regions of the tire, with a central row of blocks 3 being arranged between them. The rows of blocks 1,2 arranged in the shoulder regions and the central row of blocks 3 extend in the circumferential direction of the tire.

The rows of blocks 1,2 arranged in the shoulder regions are separated from the central row of blocks 3 by circumferential grooves 4,5, and comprise tread blocks 6,7 separated from one another by arch-shaped transverse grooves 8,9.

The transverse grooves 8,9 taper towards the middle of the tread area, with the transverse grooves 8 being formed convex in the circumferential direction and the transverse grooves 9 concave.

The central row of blocks 3 comprises tread blocks 10 each separated from one another by slightly S-shaped transverse grooves 11 and each formed from three tread block elements 12,13,14.

The tread block elements 12 are separated from their respective tread block element 13 by a longitudinal groove 15 extending in the circumferential direction of the tire. The tread block elements 13 are separated from the associated tread block 14 by an arch-shaped inclined groove 16.

Two respective adjacently positioned tread blocks 10',10" for a central tread block pair, wherein, for each pair, the longitudinal groove 15 of one of the tread blocks 10',10" is arranged so that it lines up with the inclined groove 16 of the other tread block 10",10' respectively. Further, the inclined groove 16 of one of the tread blocks 10',10" extends from the longitudinal groove 15 of the other tread block 10",10' towards the outside of the tread.

The tread blocks 10 have edges 17 at their lateral ends which extend parallel to one another but inclined relative to the central circumferential plane of the tire. Edges 18 of the tread blocks 6,7 extend parallel to the edges 17 of the tread blocks 10 and, together with the edges 17, laterally border the circumferential grooves 4,5.

As a result of the inclined edges 17,18, corners 19,20 jut out into the circumferential grooves 4,5, which result in better grip of the tread in snow and thus better winter performance.

Sipes 21,22,23 (which are also sometimes referred to in the art as knife-cuts) are provided both in the central tread blocks 10 and in the lateral tread blocks 6,7, wherein the sipes 21 provided in the lateral tread blocks 6,7 extend perpendicular to the running direction of the tire. The sipes 22 provided in the central tread block elements 13 also extend perpendicular to the running direction of the tire, whereas the sipes 23 provided in both the outer tread block elements 12,14 of a central tread block 10 extend substantially along the longitudinal direction of the relevant central tread block 10.

The distance between the sipes 21 provided in the lateral tread blocks 6,7 is smaller than the distance between the sipes 21,22 provided in the central tread blocks 10, so that a more pronounced dividing-up of the lateral tread blocks 6,7 is achieved by the sipes 21.

The lateral edges 17 of the central tread blocks 10 are arranged displaced in the circumferential direction relative to the lateral edges 18 of the lateral tread blocks 6,7 which results in a quieter running of the tire.

Having now described my invention what I claim is:

1. A pneumatic vehicle tire comprising a tread wherein the tread comprises a central row of tread blocks extending in the circumferential direction of the tire and a shoulder row of tread blocks arranged in each shoulder region of the tire, each of the shoulder rows being separated from the central row of tread blocks by a circumferential groove, at least one adjacent pair of tread blocks of the central row being separated by an S-shaped transverse groove extending from the one circumferential groove to the other circumferential groove, the S-shaped transverse groove being inclined relative to the circumferential direction of the tire, the edges of the tread blocks which laterally border the circumferential grooves extend inclined relative to the central circumferential plane of the tire, and a plurality of wave-shaped sipes are provided in each of the rows of tread blocks, with the tread blocks of the shoulder rows being more pronouncedly divided up by the sipes than the tread blocks of the central row of blocks, the sipes in the tread blocks of the shoulder rows of blocks being arranged substantially perpendicular to the circumferential direction of the tire, wherein each of the tread blocks of the central row include first outer, central and second outer tread block elements, said first outer tread block element and said central tread block element being separated by a longitudinal groove extending in the circumferential direction of the tire and said central tread block element and said second outer tread block element being separated by an arch-shaped inclined groove.

2. The tire in accordance with claim 1, wherein in each adjacent pair of tread blocks of the central row the first outer tread block element and the second outer block element of one of the tread blocks of said pair are circumferentially adjacent to the second outer tread block element and the first outer tread block element of the other of said pair, respectively, such that the longitudinal groove of the one tread block is so arranged to align with the arch-shaped inclined groove of the other tread block, with the arch-shaped inclined groove of the one tread block extending towards the outer side of the tread starting from the longitudinal groove of the other tread block.

3. The tire in accordance with claim 2, wherein each said pair of tread blocks of the central row is formed and arranged point-symmetrically relative to a series of points at the intersection thereof with the tire equator.

4. The tire in accordance with claim 1, wherein sipes of a first portion of the plurality of sipes disposed in the central tread block elements extend substantially perpendicular to the circumferential direction of the tire and the sipes of a second portion of the plurality of sipes disposed in the first and second outer tread block elements extend obliquely to the circumferential direction of the tire and along the longitudinal direction of the tread block of the central row.

5. The tire in accordance with claim 1, wherein the number of tread blocks of one shoulder row is equal to the number of tread blocks of the central row, the number of tread blocks being 70 or more.

* * * * *